May 14, 1963   A. J. FERNICOLA   3,089,917
MEANS AND METHOD FOR STEREOSCOPIC TELEVISION VIEWING
Filed Aug. 21, 1961   5 Sheets-Sheet 1

INVENTOR.
ANTHONY J. FERNICOLA
BY Richard von K. Bruns
Atty.

May 14, 1963  A. J. FERNICOLA  3,089,917
MEANS AND METHOD FOR STEREOSCOPIC TELEVISION VIEWING
Filed Aug. 21, 1961  5 Sheets-Sheet 2

INVENTOR.
ANTHONY J. FERNICOLA
BY

May 14, 1963    A. J. FERNICOLA    3,089,917
MEANS AND METHOD FOR STEREOSCOPIC TELEVISION VIEWING
Filed Aug. 21, 1961    5 Sheets-Sheet 3
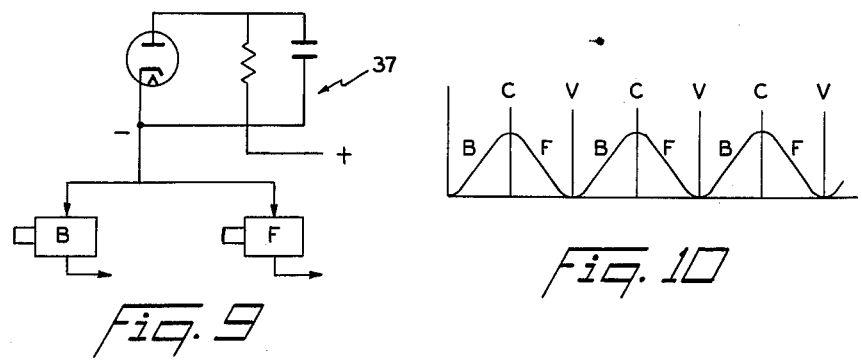
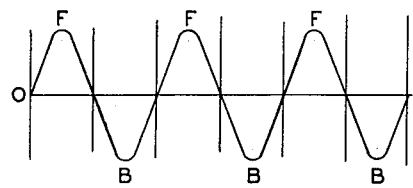
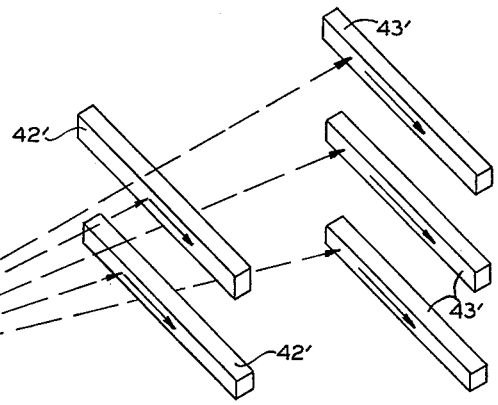
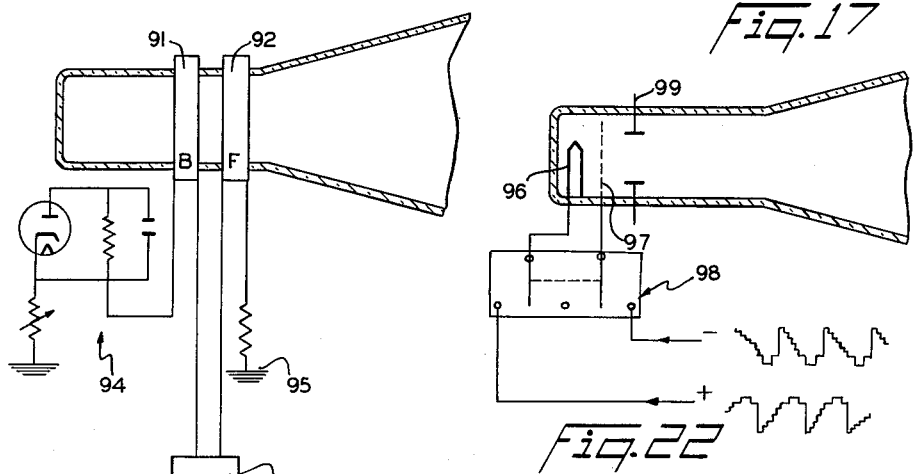
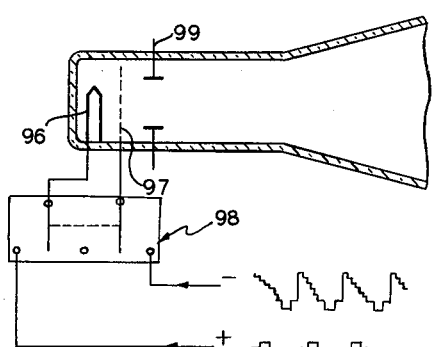
INVENTOR.
ANTHONY J. FERNICOLA
BY May 14, 1963  A. J. FERNICOLA  3,089,917
MEANS AND METHOD FOR STEREOSCOPIC TELEVISION VIEWING
Filed Aug. 21, 1961  5 Sheets-Sheet 4

INVENTOR.
ANTHONY J. FERNICOLA
BY

May 14, 1963   A. J. FERNICOLA   3,089,917
MEANS AND METHOD FOR STEREOSCOPIC TELEVISION VIEWING
Filed Aug. 21, 1961   5 Sheets-Sheet 5

INVENTOR.
ANTHONY J. FERNICOLA
BY

United States Patent Office 3,089,917
Patented May 14, 1963

3,089,917
MEANS AND METHOD FOR STEREOSCOPIC
TELEVISION VIEWING
Anthony J. Fernicola, 8 Prospect St., Utica, N.Y.
Filed Aug. 21, 1961, Ser. No. 132,624
19 Claims. (Cl. 178—6.5)

This invention relates to a system for stereoscopic televising and more particularly to a method and means for separately televising foreground and background and projecting the separate images on multiple screens of a picture tube so that the resulting combined image gives the appearance of depth.

Stereoptical devices in the past have been based almost universally on the theory that the two eyes of a viewer receive slightly different images which when received by the brain result in the illusion of depth. The remarkable degree of depth perception possible when viewing with only one eye, however, has inspired a more modern theory that the human eye, in viewing any object is continually moving and thus performs a scanning process. Just what physiological process is involved is in doubt, but it can be demonstrated that when two flat scenes or photographs are taken from the same spot and retouched to eliminate background from the one and foreground from the other and projected or otherwise presented to be substantially simultaneously viewed on screens slightly separated from one another at tandem, the illusion of depth is remarkable. This presentation of two or more flat scenes separated in depth may be termed polyplane viewing.

It is the principal object of the present invention to provide a method and means for polyplane viewing of a televised image or images.

Further objects are to provide means for scanning or otherwise registering with television cameras separate but coordinated views of foreground and background, broadcasting the registered views receiving the resulting broadcast signals, and projecting the separate views as received on two or more screens separated in depth and so arranged that the projected views appear as one image giving the illusion of depth.

Other objects and advantages will become apparent from the following description taken in conjunction with the accompanying drawings, in which:

FIGURE 9 is a diagrammatic view of a timer means;

FIGURES 10 and 11 are diagrammatic views of alternate types of timer generated wave forms;

FIGURE 17 is a diagrammatic representation of the image projection raster;

FIGURES 21 and 22 are diagrammatic views of a portion of a picture tube showing respectively alternate means for focusing.

Polyplane Viewing

Figure 1:
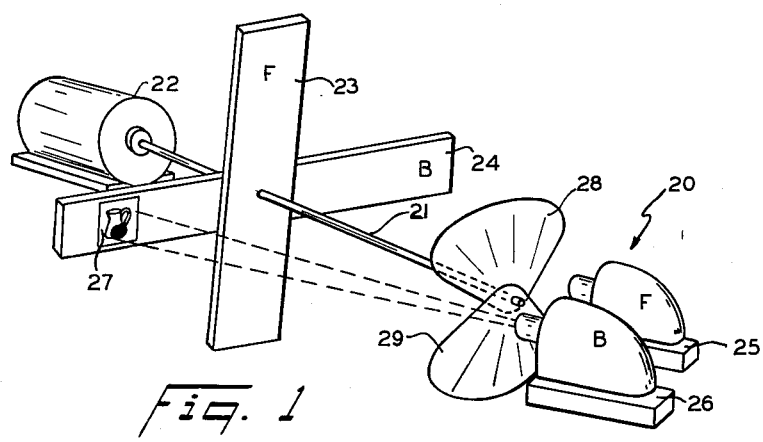
FIGURE 1 is a perspective view of a device for demonstrating polyplane viewing.

Referring now more particularly to FIGURES 1-5, a device 20 for demonstrating the efficacy of polyplane viewing, has a shaft 21, rotatable by a motor 22. Two screen cross-members 23 and 24 are secured on shaft 21 at right angles to one another. A spacer, not shown, separates the members 23 and 24 axially on shaft 21 by about one-half inch.

Two projectors 25 and 26 are placed so as to project an image on the members 23 and 24 at a selected area 27. Between the projectors and the screen members two interrupter shutters 28 and 29 are secured to the shaft 21 so as to interrupt or prevent the projection of any image on the members 23 and 24 except when one arm or the other of the members is in position at 27. Shutters 28 and 29 are also disposed on the shaft with respect to the members 23 and 24 so that the image from projector 26 falls only on member 24, and the image from projector 25 falls only on the member 23.

Figure 2:
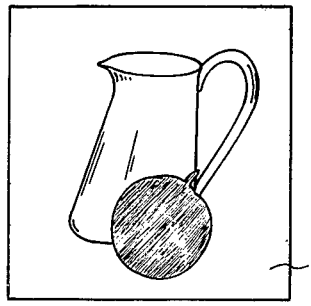
FIGURES 2 and 3 are diagrammatic views of background and foreground transparencies respectively.
Figure 3:
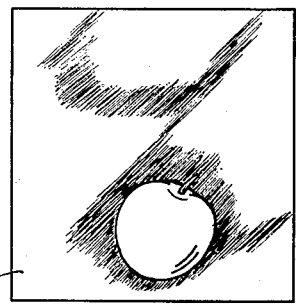
Figure 4:
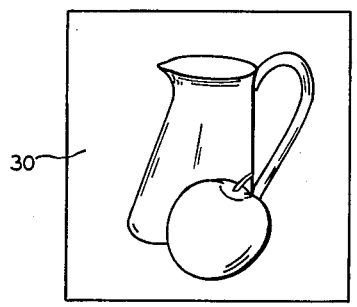
FIGURE 4 is a representation of the scene or photograph from which the transparencies of FIGURES 2 and 3 were prepared.

Transparencies 30B and 30F, shown in FIGURES 2 and 3 respectively, are prepared from a picture 30 shown in FIG. 4. The transparency 30F has the background blacked out and transparency 30B has the foreground blacked out.

Figure 5:
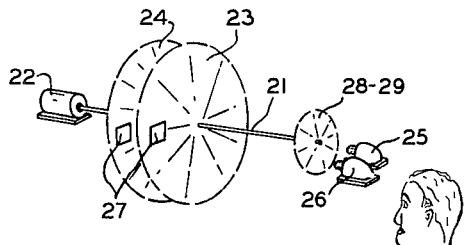
FIGURE 5 is a diagrammatic perspective view of the device of FIGURE 1 in use.
Figure 6:
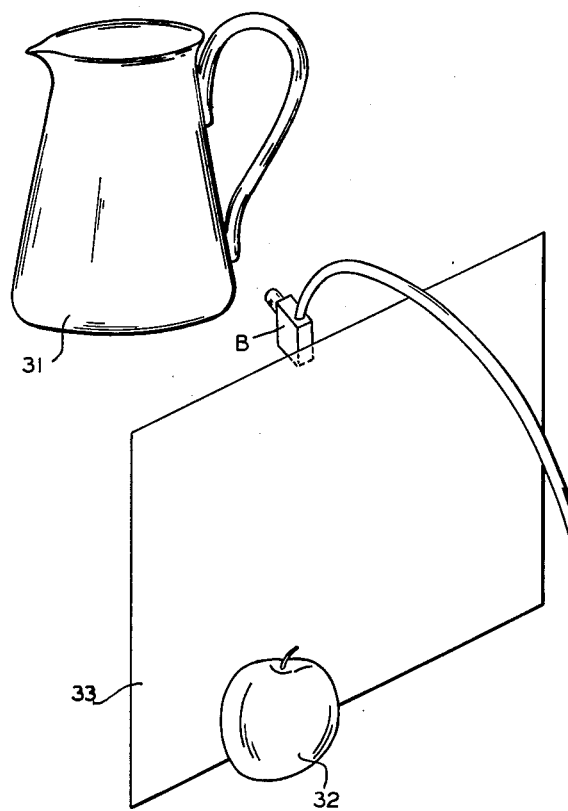
FIGURE 6 is a diagrammatic perspective view of the method and means for televising a scene according to the invention.

The device 20 is shown in operation in FIGURE 5. Transparency 30F in projector 25 and transparency 30B in projector 26 are flashed momentarily on screen members 23 and 24 respectively when each reaches the position at 27 as the motor rotates shaft 21 at an arbitrarily selected speed of about 2800 r.p.m. A viewer, as illustrated in FIGURE 5 back of the projectors, sees one apparent image at 27 like the picture 30, due to the well known persistence of vision phenomenon. Since the background is on a screen actually slightly back of the foreground screen, the viewed resulting image is remarkably lifelike and appears to have actual depth.

It will now be apparent that three or more screens and transparencies could equally well be used for foreground, middle distance, and background, for polyplane viewing, but, for simplicity, only biplane viewing will be discussed hereinafter. Obviously three or more planes may be provided for by multiplication of the methods and apparatus hereinafter described.

It will also hereinafter become apparent that some of the devices and techniques described are similar to those known in the color television field.

The Television Camera

Figure 7:
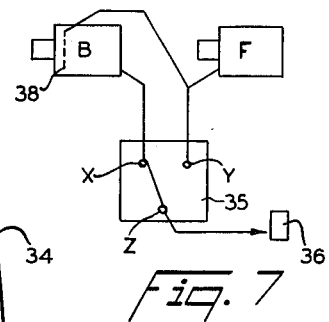
FIGURES 7 and 8 are diagrammatical views of the cameras of FIGURE 6 showing timer operated switch means for alternating the cameras.
Figure 8:
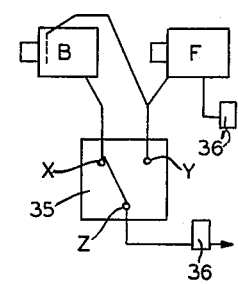

Referring now more particularly to FIGURES 6, 7, 8 and 9, a background object 31 and a foreground object 32 with an intervening opaque screen or filter 33 may be photographed or scanned by the two television cameras B and F respectively. The cameras are connected to move in unison, either by a physical connection or boom 34 as shown, or electrically, as for instance by the use of servo-motors. In addition the cameras are also connected electrically so as to transmit each view alternately as indicated in FIGURE 7. This electrical connection includes a switching device diagrammatically indicated at 35 and comparable to the interrupter shutters 28, 29 of FIG. 1. Switch 35 is in the position XZ for one sixtieth of a second, just long enough for the background camera B to scan one field, i.e., the alternate lines which the ordinary camera scans during its first sweep before returning vertically to retrace or scan the interlacing lines.

Contemporaneous with the usual vertical synchronization or "sync." pulse which usually signals the return of the scanning spot in the camera iconoscope or orthicon tube to the top of the image, the switch 35 is turned to the position YZ for a like instant of time, connecting the foreground camera F to the transmitter 36. Camera F remains connected to the transmitter and camera B disconnected for one sixtieth of a second while the scanning spot of the F camera tube traces the interlace field of its frame, which is the foreground. At the end of this brief interval, switch 35 is again reversed to the XZ position connecting B camera with the transmitter for again scanning the background.

It will be understood that the switch 35 is diagrammatic and is shown for illustration only. A number of devices to perform the function of switch 35 will occur to those familiar with the art, among them the filter circuit timer 37 shown in FIGURE 9. The timer 37 supplies a negative voltage for one sixtieth of a second and is connected to the camera control grids. The resulting generated wave is an equally spaced one-half sine wave in which crest C to crest C is equal to valley V to valley V, such as illustrated in FIGURE 10. The control grid of camera F is made to cut off with a dropping voltage and the control grid of the B camera cuts off with a rising voltage.

In the alternative, a double detector generating a regular sine wave as shown in FIGURE 11, may be used to perform the function of switch 35. The control grid of camera F is made to operate "open" positively and that of camera B negatively.

Thus far, video signals from B and F cameras are transmitted and, as hereinafter described, the scenes scanned will be seen each projected on its respective screen at the receiver. However, B camera's signal must be suppressed when the F camera is excited by a foreground object to prevent a double exposure. The signal from the F camera is suppressed for all but foreground objects by the screen 33, FIG. 6. This is comparable to retouching the transparencies as shown at FIGURES 2, 3 and 4.

Accordingly means are provided for suppressing or blanking the signal of the B camera while it is scanning portions of the image behind foreground objects. Each camera scans its scene in unison with the other, the deflection circuit of the one being connected to that of the other. A suppresser grid 38 (FIG. 7) is provided in the B camera and is connected to the output side of the F camera. When F camera views an object the voltage rises as its signal increases due to viewing the object, whereas when no object is viewed the voltage is zero. It follows, therefore, that with each rise of voltage of the F camera, that is, when it is viewing a foreground object in any one line of its raster, the B camera is blanked out by reason of the energizing of the suppresser grid 38. Assuming B camera scans on the lace, the suppression of the B camera signal can take place through a conventional condenser resistor coupling to delay the suppression pulse one sixtieth of a second after F camera has scanned a foreground object on the interlace.

The Transmitted Signal

It will now be apparent that means must be provided in the transmitted wave for signalling the receiver to project the portion of the signal from F camera onto the foreground screen and to project the portion of the signal from B camera onto the background screen. This may be done by pulses similar to the synchronizing, blanking, and color pulses known in the art. These pulses may be termed "polyplane pulses."

Figure 12:
FIGURES 12 and 13 are diagrammatic representations of the waveforms broadcast by the background and foreground cameras, respectively.
Figure 13:

By means of switch 35, FIG. 7, the B camera's signal is modulated on the carrier wave for one sixtieth of a second and its wave form is as shown in FIG. 12, the video portion of the wave being denoted V, the horizontal blanking pulses denoted HB, and the horizontal sync. pulses denoted HS. The B wave of FIG. 12 is shown in broken lines for distinguishing it from the signal from the F camera, the wave form of the signal from F camera being shown in FIG. 13 in full lines. The signals shown in FIGURES 12 and 13 are electrical representations of background and foreground portions of the scene scanned by the cameras B and F and are comparable to the transparencies shown in FIGURES 2 and 3 respectively.

After one sixtieth of a second, the time taken to transmit one field from B camera, a polyplane pulse P is emitted by the transmitter, and the transmitter begins broadcasting the next field from the F camera. At the end of each field, the transmitter normally must emit vertical blanking and equalizing pulses shown at VB and EP respectively in FIG. 14. Accordingly, the polyplane pulse P may conveniently be impressed on the "back-porch" portion or end of the equalizing pulses as shown at P, in FIG. 14, just as color signal pulses are carried on the "back-porch" of HS pulses.

Alternatively, the P pulse may be imposed on the carrier wave at any point along the vertical blanking area of the wave.

Figure 14:
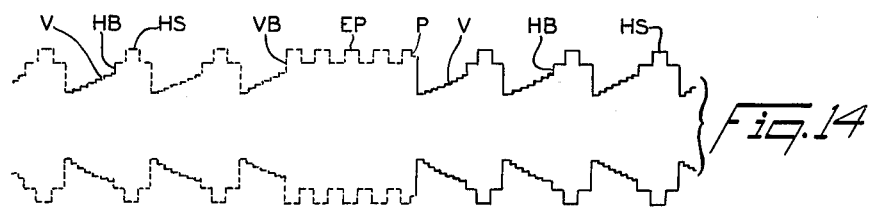
FIGURE 14 is a diagrammatic representation of the broadcast waveform.

The wave form of the signal detected by the receiver, therefore, is that shown in FIG. 14, and the receiver may thus be synchronized with the alternately transmitting cameras.

Such a signal received by a present day set would be compatible by showing background on lace, for instance, and foreground on interlace. An alternative is suggested in FIGURE 8, however, in which a second transmitter 36' is furnished for camera F. Cameras B and F would broadcast alternately through switch 35 and transmitter 36. Camera F would also broadcast continuously through its own transmitter 36'. The second transmitter, of course, would require a second separate channel.

While the present invention is not otherwise concerned with the concurrently transmitted audio signal, it will be apparent that the alternate transmittal of foreground and background video signals is excellently adapted for transmittal of stereo-radio signals, if desired.

The Receiver

Figure 16:
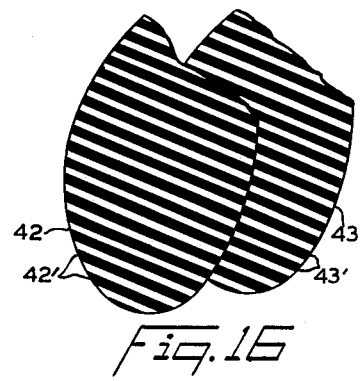
FIGURES 15 and 16 are diagrammatic perspective views respectively of alternate types of television picture tube screens.
Figure 15:
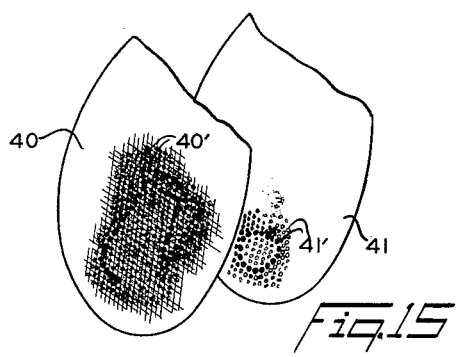

Referring now to FIGURES 15 and 16, there are two known general types of multiscreen picture tubes which may be utilized for polyplane viewing. In FIGURE 15 a background screen 40 may be supported in any convenient manner in the tube a fractional part of an inch back of the foreground screen 41 which most conveniently is affixed to the front wall of the tube. Screen 40 comprises a fine wire mesh having a large number (of the order of 300,000) of holes. An equal number of phosphor dots 40' are painted on the mesh alternating with the holes. Screen 41 is painted on the front wall of the tube and has an equal number of phosphor dots 41' aligned with the holes in screen 40. Two electron guns may be used, one aligned with the phosphor dots 40' of screen 40 and one with the dots 41' of screen 41. Alternatively a single gun may be used with means for selectively deflecting the beam of electrons from one alignment to the other.

The operation of the receiver with this type of picture tube will be apparent. The receiver is provided with a switching device synchronized with the switching device 35 of the cameras by means of the sync. pulse P for operation of first one gun and then the other according to whether the video signal is broadcast by one camera or the other. Signals broadcast from camera B are traced by one electron gun on screen 40 illuminating briefly the phosphor dots 40' thereon to produce the background image. Alternately, signals from camera F are transmitted by the other gun as an electron stream tracing the foreground image on screen 41.

FIGURE 16 illustrates another well known type of multi-screen tube. The screens 42 and 43 comprise horizontal strips of phosphors 42' and 43' painted or otherwise affixed to the screens 42 and 43, respectively, the foreground screen being of glass. The background screen is of very fine wire mesh pervious to a moving stream of electrons directed at the foreground screen. This type of screen is obviously better suited to polyplane viewing employing more than two screens.

The operation of this type of picture tube may best be described with reference to FIGURE 17. Assuming a single electron gun is used with either electromagnetic or electrostatic means for deflecting the electron beam from the bars 42' of the background screen to the bars 43' of the foreground screen, the video signal is used to induce fluorescence in the usual manner along each strip 42' of the background screen as the electron beam follows its raster or pattern of one field during lace under control of the background camera B. After one sixtieth of a second, upon receipt of the polyplane sync. pulse by the receiver, a switching device is operated to initiate the deflection field for directing the path of the electron beam along the strips 43' of the foreground screen. During the interlace portion of the frame the beam produces fluorescence along the strips 43' of the foreground screen according to the image scanned by the foreground camera F. At the next vertical blanking interval the deflection means is switched off for again tracing the background image.

It will be noted that the one sixtieth of a second intervals during which each screen has no image thereon is well within the one-tenth of a second period of the persistence of vision and within the twenty-fifth of a second per frame desirable to prevent flicker. Since the foreground screen 43 is transparent between the phosphor strips 43' and the distance between screens is minimal, the strips 42' may be viewed through screen 43. Screens 42 and 43 correspond to the areas 27 on members 23 and 24 of FIGURE 1.

Figure 18:
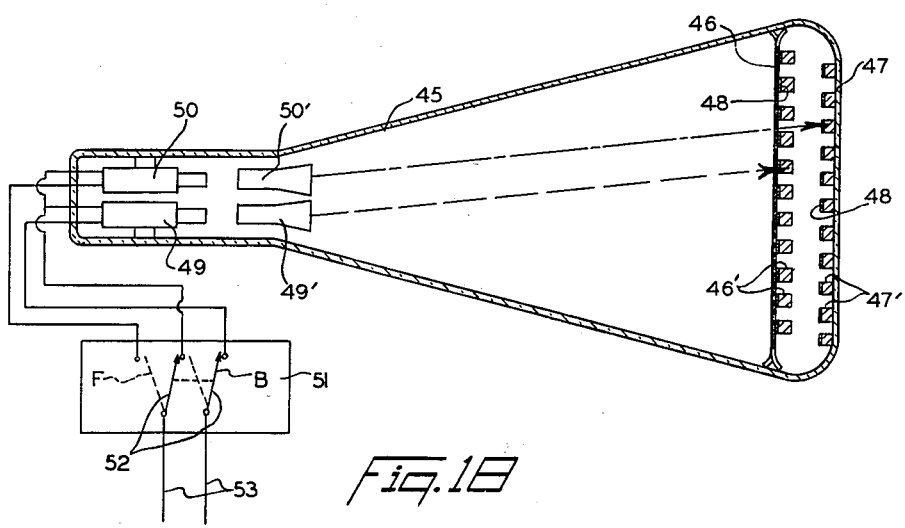
FIGURE 18 is a diagrammatic representation of one form of picture tube with means for projecting the broadcast signal on the multiple screens thereof.

A more detailed description of the operation of the switch means for deflecting the beam or spot from the background to the foreground screen may best be seen by reference to FIGURE 18 showing a picture tube 45 having a background wire mesh screen 46 and a foreground glass screen 47 which is the front wall of the tube. The screens are painted with phosphor strips 46' and 47' backed by the usual thin coating of aluminum 48 to prevent backward glowing of the phosphors.

Tube 45 is provided with two electron guns 49 and 50, each with its respective deflection means 49' and 50'. Gun 49 is positioned to illuminate the phosphors of the background screen 46 and gun 50 is positioned to illuminate the foreground screen 47, as indicated by the broken line arrows in FIG. 18, according to the received video wave by the usual circuits, not shown.

Means, the operation of which is initiated by the transmitted polyplane or P pulse, is provided for switching the received video signals first to gun 49 for one sixtieth of a second, and then to gun 50 for one sixtieth of a second. This switching device is diagrammatically represented at 51 in FIG. 18, but it will be understood that any conventional means capable of connecting first one gun and then the other with the usual tuning and amplifying circuits of the receiver may be used.

Switch 51, in effect, is a double pole, double throw switch whose connected blades 52 are each connected to one of the leads 53 from the tuning and amplifying circuits not shown. When the blades 52 are in the position B, shown in full lines, the detected signal is carried to gun 49, and when in the position F, shown in broken lines, the signal is carried to gun 50.

Switch 51 may be operated by a filter circuit timer similar to that shown in FIGURE 9, and synchronized with the camera timer by means of the P pulse, so as to alternate between positions B and F every one sixtieth of a second.

Figure 19:
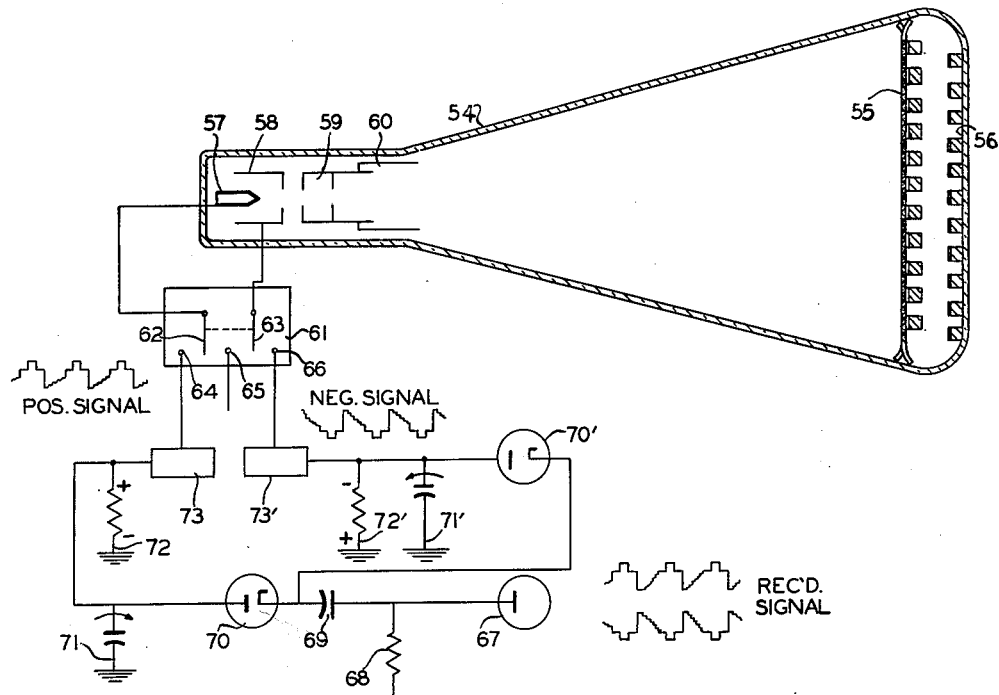
FIGURES 19 and 20 are diagrammatic views of modified forms of picture tubes showing alternative means for projecting the broadcast signal upon the multiple screens thereof.

In FIGURE 19 a more detailed diagram is presented illustrating alternative means for alternately switching from background to foreground screens.

The picture tube 54 has a background screen 55 and a foreground screen 56 similar to the screens 46 and 47 respectively of FIGURE 18. The inner end of the tube is provided with a single electron gun comprising cathode and heater 57, grid 58, and first and second anodes 59 and 60. Screen 55 is behind screen 56 by a distance equal to the distance cathode 57 is behind grid 58.

Switch means 61, diagrammatically shown as a double pole, double throw switch and operated like the switch 51 of FIG. 18, is provided for alternately connecting first the cathode and then the grid with the detected and amplified signal.

The linked switch blades 62 and 63 are connected, respectively, to the cathode 57 and grid 58 of the tube, and are adapted to contact the terminals 64, 65 and 66 so as to send the detected signal first to the cathode and then to the grid. For clarity, the connection of terminal 65 with the tube 55 is not shown but it will be understood to be entirely conventional.

Two detecting and amplifying circuits are provided for detecting the signals destined for the cathode negatively and those destined for the grid positively. From the first detector 67, tuning circuit 68, and coupling capacitor 69, the signal is separated into positive and negative components by the circuits which lead to the terminals 64 and 66 respectively of switch 61. Each circuit comprises respectively a second video detector 70, 70', variable capacitors 71, 71', variable resistances 72, 72', and video amplifiers 73, 73'. The signal from B camera is always detected positively and that from F camera negatively.

Under control of the transmitted polyplane sync. pulses the blades 62 and 63 alternately connect terminal 64 with the cathode 57 for emission of the electron stream toward the background-screen 55, and then connect terminal 66 to the grid 58 for emission of the electron stream toward the foreground screen 56. The usual synchronizing separator, and horizontal and vertical deflection circuits for control of the beam are omitted in the diagram to simplify the description. It will now be seen that a single electron gun may thus be used. Background signals being detected positively and foreground signals negatively, the electron gun may be focused on the background screen 55 and also on the foreground screen 56, since the grid is ahead of the cathode. Thus, the higher voltage values of the video signal will darken the respective screen according to whether the signal is detected positively or negatively.

Figure 20:
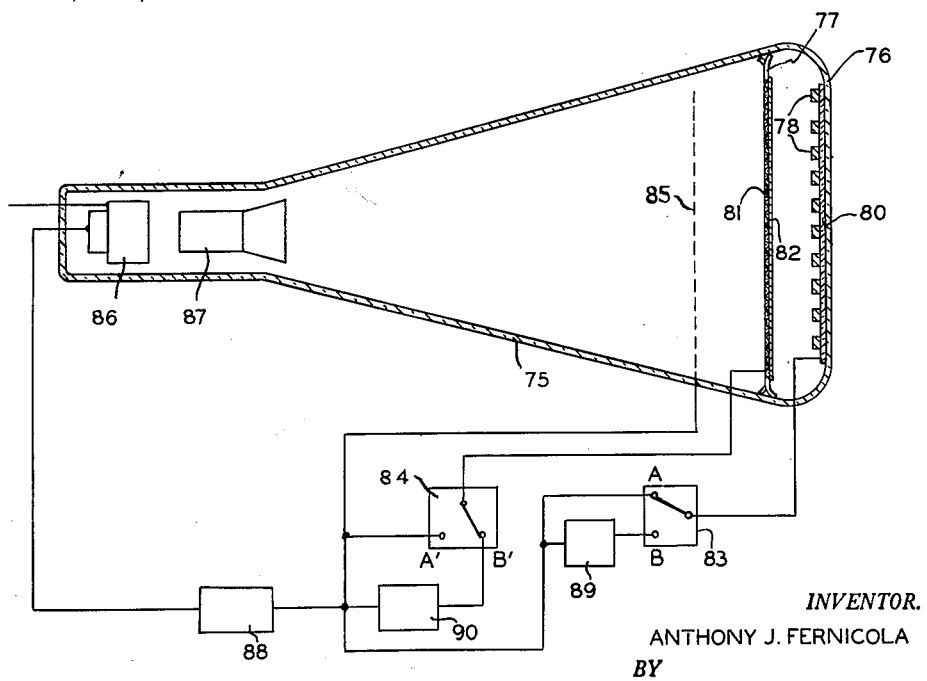

In FIGURE 20 a tube 75 is shown with a foreground screen 76 and background screen 77. The screen 76 comprises spaced phosphor strips 78 mounted on the inside surface of glass face 79 of the cathode ray tube 75, which face has first been electrically coated with a transparent conducting layer 80 such as tin oxide (SnO). Screen 77 is spaced a small distance back of screen 76 and comprises an electron pervious fine wire mesh 81 coated on its forward or outer side with a layer of a phosphor 82 capable of yielding secondary emission electrons.

Screen 76 is connected to the switch 83 and screen 77 is connected to the switch 84 for varying the potential of the screens with respect to an electrode 85 in the form of a fine wire grid which is located near screen 77.

Tube 75 is provided with the usual electron gun 86 comprising heater, cathode, grid, and anodes controlled by the usual circuit, not shown, for electron emission according to the video wave. Also provided is the usual deflection means 87 either external or internal to tube 75, controlled by another conventional circuit, not shown, for scanning according to the sync. and blanking pulses carried by the signal wave.

The electrode 85 is kept at the same fixed potential as the gun 86 through power source 88. Additional power sources 89 and 90 are connected respectively to one of the switch contacts of each of the switches 83 and 84, the other contact of each switch being connected to the power supply of fixed potential 88.

Switches 83 and 84, controlled by the polyplane sync. pulses of the signal wave, move in unison at the end of each field to alternately connect screens 76 and 77 to the sources of increased potential 89 and 90.

Upon an increase of potential of either screen with reference to the electrode 85, the electron velocity of the stream from gun 86 is increased. During a frame in which the electron emission is controlled by the signal from background camera B, the switch 84 is in position B' as shown and hence screen 77 is at the higher potential thus attracting the electrons and obtaining illumination of the background screen. Switch 83, however, is in position A and screen 76 is at the lower potential.

During the next frame switch 83 is in position B and switch 84 is in position A'. Screen 76 therefore is at the higher potential and screen 77 at the fixed potential. The phosphor layer 82 is chosen for its capability of secondary emission. When the transparent conductive layer 80 of screen 76 is at the higher potential the secondary electrons ejected from the front side of the layer 82 are accelerated so as to strike the phosphor bars 78 of the foreground screen to trace the broadcast image scanned by camera F. By proper choice of thickness of the phosphor layer 82 and choice of potential differential between the screen 81 and layer 82, it is possible to excite the image on screen 76 with negligible excitation of the phosphor layer 82 or with a slight brightening of the layer 82 to reinforce the image on screen 76.

While the multiple screens of the picture tubes hereinabove described may be of the monochrome type for the practice of the invention, it will be appreciated that polychrome screens may also be used for color television viewing. Interesting enhancement of the stereo effect of the use of polyplane screens above described may also be obtained by the use of tinted phosphors having one color for the foreground and another for the background. For example, the stereo effect is enhanced by the use of a blue tinged phosphor for foreground screen and a red tinged phosphor for background.

Provision for focusing may be made as shown in FIGURE 21 by using two focusing coils 91 and 92, the one for the background screen and the other for foreground. Each coil is connected to the usual tuning circuit 93 but one, coil 91 for instance, is tied in to a rectifier circuit 94 which oscillates at the same frequency as the transmitting switch and at a current heavy enough to overcome the current of the other at peak voltage. The other coil has a fixed potential as indicated at 95.

Focusing is perhaps more easily accomplished when positively and negatively modulated signals from background and foreground cameras are applied to the cathode and control grid respectively of a tube such as illustrated in FIGURE 19. In FIGURE 22 positive and negative received signals are alternately connected to cathode 96 and grid 97 respectively by a switching device 98. If the space between control grid and cathode is correct for sharp focusing between foreground and background screens, then fine focusing may be obtained electrostatically in the usual manner by the use of anodes and deflection plates as indicated generally at 99, or by the use of a single focusing coil.

As will be apparent to those familiar with the art, the invention may be embodied in other specific forms without departing from the spirit or essential characteristics thereof. The embodiments disclosed are therefore to be considered in all respects as illustrative rather than restrictive, the scope of the invention being indicated by the appended claims.

What is claimed is:

1. A television system for stereoscopic viewing of a scene having objects disposed in depth, said scene having portions ranging from foreground to background, comprising: a television camera for each portion, said cameras being synchronized to scan the scene in unison and being provided wtih means for blanking the signals of each camera as it scans the portions directly behind each foreground object, means for preventing each camera from scanning any portion rearward of its portion, transmitter means for broadcasting the signals from said cameras, switch means for rapidly successively connecting the cameras alternately to the transmitter means, said transmitter being adapted to broadcast a wave including successive signals from said cameras and including a signal of each switch change from one camera to the next, and receiver means for detecting and amplifying said broadcast wave, said receiver means including a picture tube for viewing the scene scanned by said cameras, said tube having spaced phosphor-coated screens, one screen for each scene portion, said screens being at successively spaced intervals from the viewer, and said receiver having means responsive to said switch change signal for illuminating the phosphor-coating of said screens successively.

2. A television system for stereoscopic viewing of a scene having objects disposed in depth, said scene having background and foreground portions, comprising: a television camera for each portion, said cameras being synchronized to scan the scene in unison and being provided with means for blanking the signals from the background camera at each instant the foreground camera is scanning a foreground object, means for preventing the foreground camera from scanning any part of the background, transmitter means for broadcasting the signals from said cameras, means for rapidly alternately connecting the cameras to the transmitter means, said transmitter means being adapted to broadcast a wave including alternating signals from each camera and including a signal of each connection change from one camera to the other, and receiver means for detecting and amplifying said broadcast wave, said receiver means including a picture tube for viewing the scene scanned by said cameras, said tube having spaced background and foreground phosphor-coated viewing screens spaced at tandem, said foreground screen having transparent areas interspersed with minute phosphor-coated areas, and said receiver means having means responsive to said connection change signals for illuminating the phosphor-coating of said screens alternately.

3. A television system for stereoscopic viewing of a scanned scene having foreground and background objects, comprising: separate camera means for scanning foreground and background objects; a boom connection between said camera means for synchronous scanning, the deflection circuits of said camera means being connected for scanning in unison; screening means between said camera means for preventing the scanning of background by foreground camera means, and said background camera means having a suppressor grid connected to the foreground camera means for preventing the scanning of background behind foreground objects; transmitter means for broadcasting signals from said camera means, the connections between said camera means and the transmitter including switch means for alternately and successively connecting said camera means to the transmitter, said switch means being operated at the end of each field scanned; means associated with the transmitter means for impressing a pulse signal on the wave broadcast thereby at each field change; and receiver means for detecting said broadcast wave, including a viewing tube having a plurality of screens spaced at tandem, said receiver means being adapted to alternately and successively illuminate said screens in response to said broadcast pulse signal and in accordance with the broadcast camera signals.

4. A television system for stereoscopic viewing of a scanned scene having foreground and background objects separated by an opaque screen, comprising: a first camera for scanning foreground objects; a second camera behind said opaque screen for scanning background objects; said cameras being connected to scan said scene in unison; a transmitter to broadcast the signals scanned by said cameras; the second camera having a grid connected to the first camera for suppressing signals of objects behind foreground objects; switch means for connecting the transmitter to one camera for trace and to the other camera for retrace of each frame scanned, said transmitter being adapted to impress on the wave broadcast thereby a pulse signal for each field change; and a receiver adapted to detect said broadcast signals, said receiver including a viewing tube having two screens spaced at tandem and adapted to alternately illuminate first one viewing screen and then the other in response to said field change pulse signal, said viewing screens having alternating spaced phosphor-coated areas and the outer of said viewing screens being partially transparent for viewing the other viewing screen therethrough.

5. A television system for projection of a stereoscopic image comprising separate cameras for background and foreground scanning, said cameras being physically and electrically linked for simultaneous scanning in unison of background and foreground as from a single viewpoint, means controlled by the foreground camera for suppressing scanning of background behind foreground objects, means for suppressing scanning of background by the foreground camera, means for broadcasting successive alternate background and foreground scanning signals from said cameras, a receiver for detecting said successive signals, a signal pulse being broadcast by said broadcasting means for signalling the change from one camera to the other, means at the receiver to detect the signal pulse, a picture viewing tube having a plurality of screens, one behind the other at tandem for showing in picture form the received signals, electron gun means for projecting said signals and said screens, and means in said receiver for controlling the projection of the gun means on to said screens, said control means being initiated by said pulse signals.

6. A stereoscopic system for polyplane viewing of a scene having objects disposed in foreground and background portions of said scene, comprising: camera means for separately scanning images of said foreground and background portions; means for preventing the scanning of any background portion images by the camera means scanning said foreground portion images; means for preventing scanning of the image of that part of background portions directly behind foreground objects; said camera means being connected to concurrently scan images of background and foreground in unison and to emit signals in response to the scanning; a transmitter connected to said camera means for broadcasting said emitted signals, the connection between camera means and transmitter including means for sequentially broadcasting alternately signals scanned from foreground and background images; means connected with said transmitter for impressing on said broadcast signals a signal pulse for each alternation in scanned signal; and a receiver for detecting said broadcast signal including a viewing tube, said tube having a plurality of phosphor-coated viewing screens spaced at tandem, and said receiver including means for illuminating the phosphors of said screens according to said broadcast signals successively in response to said signal pulses.

7. A television system according to claim 6 in which said camera means comprises separate cameras for scanning foreground and background images, said foreground and background cameras having interconnected deflection circuits for scanning the scene in unison, said cameras being spaced in depth and having a sheet of light deflecting material therebetween for preventing scanning of background by the foreground camera, and said background camera having a suppressor grid connected to the output of said foreground camera for preventing scanning of background behind foreground objects.

8. The television system according to claim 7 having a filter timer circuit for connecting the transmitter alternately with the background and foreground cameras at regular intervals concurrent with the changes in field scanned by said cameras.

9. The television system according to claim 7 having a double detector for connecting the transmitter alternately with background and foreground cameras at regular intervals concurrent with the changes in field scanned by said cameras.

10. A television system according to claim 6 in which said receiver viewing screens comprise: a background screen of electron pervious material at least partially phosphor-coated and a foreground screen of transparent material having alternating transparent and phosphor-coated areas whereby phosphor-coated areas of the background screen are visible through transparent areas of the foreground screen.

11. The television system according to claim 10 in which the viewing tube of said receiver has a first electron gun positioned to illuminate the phosphors of the foreground screen in the course of its raster, a second electron gun positioned to illuminate in the course of its raster the phosphors of said background screen which are visible through said foreground screen, in combination with means responsive to said signal pulse for successively supplying said first and second guns alternately with said broadcast signals from said cameras.

12. The television system according to claim 10 in which the viewing tube of said receiver has a single electron gun including a cathode and a grid, in combination with a first circuit adapted to be connected to said cathode for detecting positive signals broadcast from said background camera, a second circuit adapted to be connected to said grid for detecting negative signals broadcast from said foreground camera, and means responsive to said signal pulse for successively connecting said first and second circuits alternately to said cathode and grid respectively.

13. The television system according to claim 6 in which the viewing tube of said receiver has a single electron gun, a first foreground screen of glass coated with a layer of transparent electrically conducting material, said layer having alternating transparent and phosphor-coated areas, a second background screen of electron pervious material coated with a layer of phosphor capable of yielding secondary emission electrons, and a fine wire grid electrode, said background screen and said electrode being spaced behind said foreground screen a fractional part of an inch; in combination with a power source of fixed potential connected to said electron gun and said electrode, additional power sources adapted to be connected to said screens; and means responsive to said signal pulse for alternately connecting the first screen to said fixed potential source and the second screen to one additional power source, and then connecting the second screen to the fixed potential source and the first screen to the other additional power source, whereby one screen and then the other is of higher potential with reference to said electrode.

14. The television system according to claim 11 having a first focusing coil, and a second focusing coil in advance of said first coil, said receiver having a tuning circuit connected to one coil at a fixed potential, and a rectifier circuit connecting said tuning circuit to said other coil, said rectifier circuit being adapted to oscillate at the same frequency as said signal pulse.

15. The television system according to claim 12 having said foreground and background screens spaced apart a distance equal to the distance between said cathode and said grid, said viewing tube having a single focusing coil.

16. A receiver for stereoscopic viewing of broadcast signals alternately from foreground and background cameras, said foreground camera scanning foreground only of a scene to be viewed, said background camera scanning in unison with the foreground camera the background only of said scene, the signals from said background camera being suppressed when scanning objects behind foreground objects, and signals from said cameras being broadcast from one camera on trace and the other on retrace of each field scanned, a signal pulse being broadcast at each change of signal, comprising: detector and amplifying means for receiving said signals, a viewing tube having foreground and background screens spaced at tandem, said foreground screen being of transparent material having phosphor-coated areas alternating with transparent areas, said background screen being of electron pervious material and having phosphor-coated areas visible through the transparent areas of the foreground screen, a first electron gun in said tube positioned to illuminate the phosphors of one screen and a second gun positioned to illuminate the phosphors of the other screen, and means responsive to said signal pulse for successively supplying said first and second guns alternately with the signals broadcast from said cameras.

17. A receiver for stereoscopic viewing of broadcast signals alternately from foreground and background cameras, said foreground camera scanning foreground only of a scene to be viewed, said background camera scanning in unison with the foreground camera the background only of said scene, the signals from said background camera being suppressed when scanning objects behind foreground objects, and signals from said cameras being broadcast from one camera on trace and the other on retrace of each field scanned, a signal pulse being broadcast at each change of signal, comprising: detector and amplifying means for receiving said signals, a viewing tube having foreground and background screen spaced at tandem, said foreground screen being of transparent material having phosphor-coated areas alternating with transparent areas, said background screen being of electron pervious material and having phosphor-coated areas visible through the transparent areas of the foreground screen, a single electron gun in said tube including a cathode and a grid, a first circuit for detecting positively signals broadcast from the background camera, a second circuit for detecting negatively signals broadcast from the foreground camera, and means responsive to said signal pulse for successively connecting said first and second circuits alternately to said cathode and grid respectively.

18. A receiver for stereoscopic viewing of broadcast signals alternately from foreground and background cameras, said foreground camera scanning foreground only of a scene to be viewed, said background camera scanning in unison with the foreground camera the background only of said scene, the signals from said background camera being suppressed when scanning objects behind foreground objects, and signals from said cameras being broadcast from one camera on trace and the other on retrace of each field scanned, a signal pulse being broadcast at each change of signal, comprising: detector and amplifying means for receiving said signals, a viewing tube having foreground and background screens spaced at tandem, said foreground screen being of transparent material coated with a layer of transparent electrically conducting material and having alternating transparent and phosphor-coated areas, said background screen being of electron pervious material and coated with a layer of phosphor capable of yielding secondary emission electrons, a fine wire grid electrode in said tube spaced behind said background screen at tandem, a single electron gun in said tube, a power source connected to said gun and electrode, additional power sources adapted to be connected to said screens, and means responsive to said signal pulse for alternately connecting the foreground screen to the fixed potential source and the background screen to an additional power source and then connecting the background screen to the fixed potential source and the foreground screen to the other additional power source, whereby first one screen and then the other is of higher potential than said electrode.

19. A television system for stereoscopic viewing of a scanned scene having foreground and background objects, comprising: a plurality of cameras for scanning portions of the scene separated in depth, said cameras being synchronized to scan the scene in unison as from a single viewpoint and being provided with means for blanking the signals from one camera whenever said one camera is scanning a portion of the scene behind a portion being scanned by another camera; means for preventing a camera scanning foreground objects from scanning objects in the background with respect to the said foreground objects; transmitter means and receiver means for carrying signals from said cameras to a viewing point remote from the cameras; switch means for rapidly and successively connecting the cameras in regular alternation to the transmitter means, said switch means being operated at each scanning field change; and means associated with the transmitter means for imparting a signal to the receiver means at each field change; said receiver means including a viewing tube having a separate screen for each camera, said screens being spaced at tandem, and the receiver means being adapted to alternately and successively illuminate said screens in response to said signal and in accordance with the scene scanned by each camera in turn.

References Cited in the file of this patent
UNITED STATES PATENTS

| | | |
|---|---|---|
| 2,073,370 | Goldsmith | Mar. 9, 1937 |
| 2,307,188 | Bedford | Jan. 5, 1943 |
| 2,361,390 | Ferrill | Oct. 31, 1944 |